(12) United States Patent
Borowski

(10) Patent No.: US 12,367,759 B2
(45) Date of Patent: Jul. 22, 2025

(54) METHOD FOR PROVIDING A CLEARANCE FOR USE OF A HARD SHOULDER BY MEANS OF A MONITORING SYSTEM, AND MONITORING SYSTEM

(71) Applicant: MERCEDES-BENZ GROUP AG, Stuttgart (DE)

(72) Inventor: Tim Borowski, Bielefeld (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 229 days.

(21) Appl. No.: 18/029,737

(22) PCT Filed: Sep. 29, 2021

(86) PCT No.: PCT/EP2021/076799
§ 371 (c)(1),
(2) Date: Mar. 31, 2023

(87) PCT Pub. No.: WO2022/069546
PCT Pub. Date: Apr. 7, 2022

(65) Prior Publication Data
US 2023/0386322 A1 Nov. 30, 2023

(30) Foreign Application Priority Data
Oct. 2, 2020 (DE) .................... 10 2020 006 036.6

(51) Int. Cl.
*G08G 1/01* (2006.01)
*G08G 1/04* (2006.01)
*G08G 1/0967* (2006.01)

(52) U.S. Cl.
CPC .......... *G08G 1/0112* (2013.01); *G08G 1/0125* (2013.01); *G08G 1/04* (2013.01); *G08G 1/096775* (2013.01)

(58) Field of Classification Search
CPC ...... G08G 1/0112; G08G 1/0125; G08G 1/04; G08G 1/096775
See application file for complete search history.

(56) References Cited

U.S. PATENT DOCUMENTS 9,430,944 B2 * 8/2016 Grimm ................ G08G 1/0129
2007/0005231 A1 * 1/2007 Seguchi ........... G08G 1/096775
340/933

(Continued)

FOREIGN PATENT DOCUMENTS

DE    102008019375 A1    12/2009
DE    102016211751 A1    1/2018

(Continued)

OTHER PUBLICATIONS

Auto.de; "Autobahnverkehr: Seitenstreifen befahren;" Jan. 15, 2013; https://www.auto.de/magazin/autobahnverkehr-seitenstreifen-befahren.

(Continued)

*Primary Examiner* — Brodie J Follman
(74) *Attorney, Agent, or Firm* — PATENT PORTFOLIO BUILDERS PLLC

(57) ABSTRACT

A method for providing a clearance for use of a hard shoulder of a road for motor vehicles involves detecting the hard shoulder using a detection device and an occupancy state of the hard shoulder is determined based on the basis of the detection. The clearance using the hard shoulder is provided based on the occupancy state and a decision criterion by means of a motor-vehicle-external, central electronic computing device of the monitoring system. The hard shoulder is detected by at least one detection device of a motor vehicle travelling on the road and the detected hard shoulder is transmitted to the central electronic computing (Continued)

device for evaluation. The occupancy state regarding at least one dynamic object on the hard shoulder is determined.

12 Claims, 2 Drawing Sheets

(56) References Cited

U.S. PATENT DOCUMENTS

| | | | |
|---|---|---|---|
| 2015/0009047 | A1 | 1/2015 | Ashkenazi et al. |
| 2016/0133130 | A1 | 5/2016 | Grimm et al. |
| 2021/0107470 | A1* | 4/2021 | Oboril ................ B60W 30/181 |

FOREIGN PATENT DOCUMENTS

| | | | |
|---|---|---|---|
| DE | 102016221574 A1 | 5/2018 | |
| DE | 102019206875 | 7/2020 | |
| EP | 2849165 A1 | 3/2015 | |
| GB | 2408372 A | 5/2005 | |
| JP | 2001344684 A | 12/2001 | |

OTHER PUBLICATIONS

Autobahndirektion Südbayern; "Streckenbeeinflussungsanlage mit temporärer Seitenstreifenfreigabe—A 9 Nürnberg—München—Anschlussstelle Allershausen bis Autobahnkreuz Neufahrn in beiden Fahrtrichtungen (1. Bauabschnitt);" Dec. 2012; https://www.abdsb.bayern.de/imperia/md/content/stbv/abdsb/projekte/fertiggestellt/a9_sba_tsf_1ba.pdf.

International Search Report and Written Opinion mailed Jan. 14, 2022 in related/corresponding International Application No. PCT/EP2021/076799.

Office Action created May 20, 2021 in related/corresponding DE Application No. 10 2020 006 036.6.

Office Action dated Apr. 22, 2025 in related/corresponding CN Application No. 2021800676455.

* cited by examiner

METHOD FOR PROVIDING A CLEARANCE FOR USE OF A HARD SHOULDER BY MEANS OF A MONITORING SYSTEM, AND MONITORING SYSTEM

BACKGROUND AND SUMMARY OF THE INVENTION

Exemplary embodiments of the invention relate to a method for providing clearance for use of a hard shoulder of a road for motor vehicles by means of a monitoring system, as well as to a monitoring system.

It is known from the prior art that in the case of high volumes of traffic on specific sections of motorways, for example, the hard shoulder can dynamically be given clearance in order to distribute the traffic over more lanes. When giving the clearance, a defined procedure is followed: for example, the hard shoulder is checked for motor vehicles, items and other objects potentially occupying it. Stationary sensors such as induction loops, pivotable cameras, radars, and lasers are used for this purpose. An operator of the monitoring system who looks, in particular, at the images that can be transmitted accordingly via the detection devices then manually gives final clearance for the hard shoulder to be used.

DE 10 2016 211 751 A1 discloses a method for determining and/or evaluating a state of at least one roadside object. The method for determining a state of at least one roadside object comprises the detection of optical sensor data. The sensor data relate to the at least one roadside object. The method further comprises providing a central agency with information about the state of the at least one roadside object based on the recorded optical sensor data.

Furthermore, the online article "AUTO.DE/(ZWI/MID): Autobahnverkehr: Seitenstreifen befahren [Motorway traffic: driving on the hard shoulder], dated 15 Jan. 2013. URL: https://www.auto.de/magazin/autobahnverkehr-seitenstreifen-befahren/(retrieved on 20 May 2021)" presents a method of detecting the state of a hard shoulder by means of stationary cameras and an additional check by route vehicles and providing clearance accordingly.

A detector system for determining the occupancy status of a hard shoulder is known from DE 10 2008 019 375 A1, which detector system has a measuring sensor system, based on a measurement of electric and/or magnetic fields, mounted in the area of the hard shoulder.

Furthermore, GB 2 408 372 A presents a system and a method for determining the presence of a vehicle on a roadway by means of inductive measurement loops in or on the roadway.

Exemplary embodiments of the present invention are directed to a method and a monitoring system by means of which a hard shoulder can be given clearance, in an automated manner, for use.

One aspect of the invention relates to a method for providing a clearance for use of a hard shoulder of a road for motor vehicles by means of a monitoring system, in which method the hard shoulder is detected by means of at least one detection device in the form of a camera or a radar, lidar, or ultrasound sensor, an occupancy state of the hard shoulder is determined based on the detection, and the clearance for the use of the hard shoulder is provided based on the occupancy state and based on a decision criterion by means of a motor vehicle-external, central electronic computing device of the monitoring system.

It is provided that the hard shoulder is detected by means of a detection device of a plurality of motor vehicles travelling on the road and the detected hard shoulder is transmitted to the central electronic computing device for evaluation, and the occupancy state with regard to at least one dynamic object on the hard shoulder is determined.

This makes it possible to automate the clearance of the hard shoulder, in particular without an operator needing to operate the monitoring system. In particular, sensors such as cameras, radar, laser, and induction loops are not required on an extra system to monitor the hard shoulder. This also obviates the need for cost-intensive maintenance of these sensors. There is no need for manual clearance to be given by the operator who looks at the data manually and issues the clearance. Furthermore, the monitoring system is not prone to errors, as there is no longer any manual detection and clearance, and it is no longer possible to quickly record the changes and react to them accordingly.

In the present case, the dynamic object is to be understood in particular to be a broken-down or stationary motor vehicle or a moving object. In particular, these are objects that do not remain permanently on the hard shoulder. In particular, they are not objects that relate to damage to the hard shoulder or a crash barrier.

In particular, the proposed method relates to a clearance for the hard shoulder. The sensor data of motor vehicles on the traffic lane are used for this. The data of a plurality of motor vehicles on the same route is merged on the motor-vehicle-external, central electronic computing device, which can also be referred to as a backend. Furthermore, an automated decision on the clearance is then made on the basis of the merged data.

It is thus determined whether the dynamic object is on the hard shoulder, so that a manual evaluation of the hard shoulder via appropriate sensors is avoided, with this hard shoulder then being able to be given clearance in an automated manner. This information can then in turn be sent by a functional unit on the road, for example via a Car-to-X or other communication chain to the relevant road users.

The method is in particular a computer-implemented method.

In particular, for example, if the motor vehicles involved are so-called partially autonomous motor vehicles, the hard shoulder can be monitored using a plurality of detection devices. For this purpose, this information can then be transmitted from the different detection devices of a single motor vehicle to the motor-vehicle-external electronic computing device. The relevant information can then also be transmitted from the other motor vehicles. This data is then merged in the motor-vehicle-external, central electronic computing device and the occupancy state is evaluated accordingly. In this way, it is possible to prevent a single motor vehicle incorrectly giving clearance because of sun glare or shading, for example, that stops it from detecting the dynamic object. The further detection devices of the further motor vehicles can thus verify the occupancy state.

Furthermore, it is advantageous that the determined occupancy state is verified by means of the central electronic computing device by means of the plurality of detection devices. It is thus possible to react to changes in real time. If, for example, a clearance of the hard shoulder should be given from a non-clearance. Furthermore, erroneous determinations of the occupancy state can be verified and compensated for.

In a further advantageous embodiment, a current volume of traffic is taken into account as a decision criterion when providing clearance for the hard shoulder. If a high volume of traffic is detected on the road, the hard shoulder can be given clearance. If, however, the volume of traffic is recoded as low, the hard shoulder can still be closed to traffic even though it is unoccupied, since, on the one hand, is not needed and, on the other, safety can be increased so that the hard shoulder can be kept free for vehicles that might break down in the future, for example.

It is likewise advantageous if the hard shoulder is detected for a predefined section of the hard shoulder and/or for a predefined time by means of the at least one detection device. In particular, the predefined section can only comprise the sections of the hard shoulder that are also designed for dynamic clearance. Furthermore, the corresponding recording or an evaluation can only be carried out for a predefined time, for example when there is a high volume of traffic or when the high volume of traffic is identified.

It is also advantageous if the clearance for the hard shoulder is transmitted in an automated manner to a traffic control system of the monitoring system. By way of example, the monitoring system can give the clearance, which is then transmitted in an automated manner, for example via Car-to-X or other means of communication, to the traffic control system. The traffic control system can then, in particular, have a display that indicates to a motor vehicle on the road that the hard shoulder can be used. This can be done, for example, via appropriate visual symbols.

In another advantageous embodiment, based on the detection of the hard shoulder, a confidence level is generated for the occupancy state by means of the central electronic computing device and, based on the confidence level, the clearance is provided by means of the central electronic computing device. It is thus checked, in particular, whether the information regarding the occupancy state can actually be detected by, for example, a prescribed number of detection devices. If this is not the case, for example, the confidence level for this section can be correspondingly low, so that no clearance is given for the hard shoulder. If the confidence level is correspondingly high, clearance can be given.

It is likewise advantageous if the occupancy state of the hard shoulder is determined by image recognition within the central electronic computing device. For example, a detection device—designed here as a camera—of the motor vehicle can then transmit corresponding images to the central electronic computing device. In particular, a plurality of images from a plurality of motor vehicles can then be transmitted to the electronic computing device. These can then be merged, for example, so that glare or dirt in individual camera images can still be reliably used for the evaluation. In this way, erroneous clearance can be prevented.

It is also advantageous if the clearance is provided in real time. In particular, after the hard shoulder has been detected, this is transmitted in real time to the central electronic computing device, which in turn evaluates the occupancy state in real time. If the occupancy state then allows clearance to be given for the hard shoulder, this can be done directly afterwards, in particular without any significant time delay, so that changes can be reacted to correspondingly quickly.

A further aspect of the invention relates to a computer program product having program commands which, when the computer program product is executed on the motor-vehicle-external, central electronic computing device, cause a method according to the preceding aspect to be carried out. The computer program product can be stored in particular on a computer-readable storage medium of the motor-vehicle-external, central electronic computing device.

Yet another aspect of the invention relates to a monitoring system for providing a clearance for use of a hard shoulder of a road for motor vehicles, having at least one motor-vehicle-external, central electronic computing device, wherein the monitoring system is designed to carry out a method according to the preceding aspect. In particular, the method is carried out by means of the monitoring system.

Advantageous embodiments of the method are to be regarded as advantageous embodiments of the computer program product, of the computer-readable storage medium and of the monitoring system. For this purpose, the monitoring system has substantive features which are necessary for carrying out a method or an advantageous embodiment thereof.

Further advantages, features and details of the invention result from the following description of preferred exemplary embodiments and on the basis of the drawings. The features and feature combinations already cited in the description and the features and feature combinations cited below in the description of the figures and/or shown on their own in the figures can be used not only in each of the combinations indicated, but also in other combinations or on their own, without departing from the scope of the invention.

BRIEF DESCRIPTION OF THE DRAWING FIGURES

In the figures.

Identical or functionally identical elements are provided with the same reference signs in the figures.

DETAILED DESCRIPTION

Figure 1:
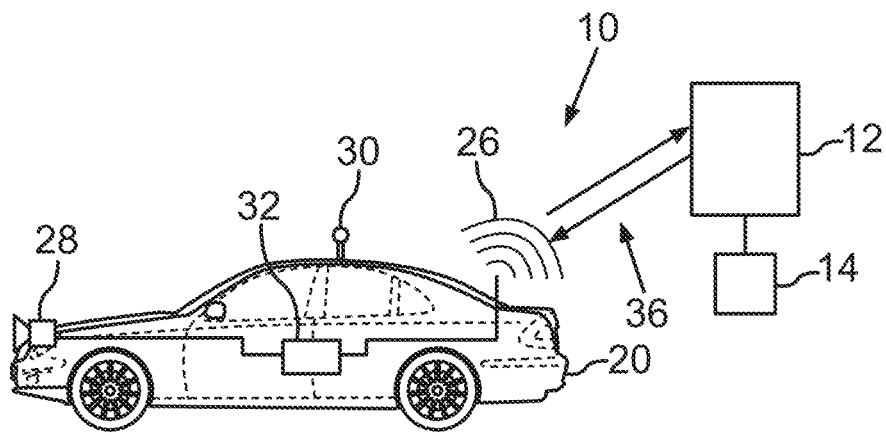
FIG. 1 shows a schematic view from the side of an embodiment of a monitoring system.
Figure 2:
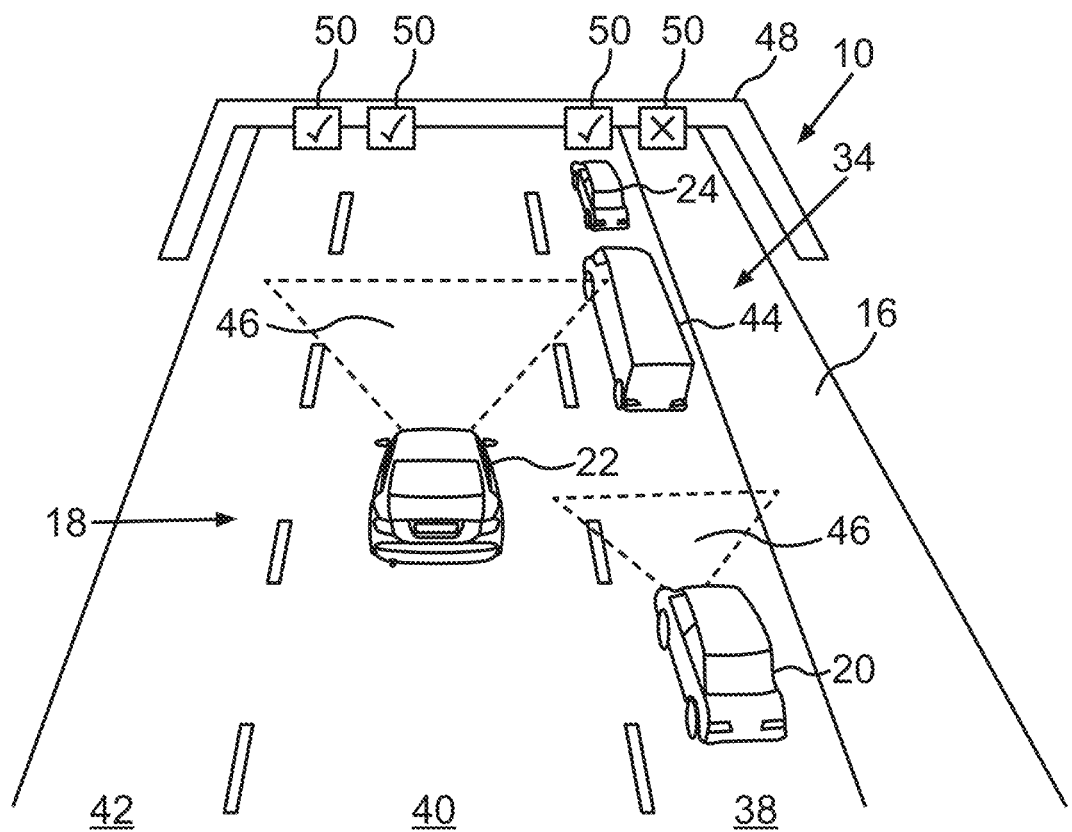
FIG. 2 shows a schematic perspective view of an embodiment of a monitoring system.

FIG. 1 shows a schematic view from the side of an embodiment of a monitoring system 10. The monitoring system 10 has a motor-vehicle-external, central electronic computing device 12. The monitoring system 10 is designed to provide a clearance 40 for the use of a hard shoulder 16 (FIG. 2) of a road 18 (FIG. 2) for motor vehicles 20, 22, 24, 44 (FIG. 2).

FIG. 1 shows, in particular, a first motor vehicle 20. The first motor vehicle 20 has a communication device 26, whereby the first motor vehicle 20 can communicate with the motor-vehicle-external, central electronic computing device 12. The motor-vehicle-external, central electronic computing device 12 can also be referred to as a backend.

In the present case, the first motor vehicle 20 has two detection devices 28, 30. A first detection device 28 can be designed as a camera and a second detection device 30 can be designed as a lidar sensor, for example. This is purely an example and is by no means to be regarded as definitive. Other detection devices 28, 30 are also possible, such as an ultrasound sensor or a radar sensor. In the present case, the first motor vehicle 20 has a merging device 32. The merging device 32 can carry out a sensor merging operation. In particular, a partial interpretation for an occupancy state 34 (FIG. 2) or a full interpretation of the occupancy state 34 can be carried out. Furthermore, in particular, information 36 is exchanged with the motor-vehicle-external electronic computing device. For example, a position of the first motor vehicle 20 and/or a point in time and/or an object can be transmitted accordingly to the motor-vehicle-external electronic computing device 12. Furthermore, live images or videos at a point in time at a specific location can be transmitted. Furthermore, a clearance for the hard shoulder at position X at a point in time Y can be transmitted to the motor-vehicle-external, central electronic computing device 12 as a suggestion. From the motor-vehicle-external electronic computing device 12, again for example, so-called geofence information can be transmitted to the first motor vehicle 20. Only the first motor vehicle 20 is shown in the following exemplary embodiment. The same method or the same features can also be executed for the second motor vehicle 22 and the third motor vehicle 24 as per FIG. 2.

In the method for providing the clearance 14 for the use of the hard shoulder 16 on the road 18 for motor vehicles 20, 22, 24 by means of the monitoring system 10, the hard shoulder 16 is detected by means of at least one detection device 28, 30 and, based on the detection, the occupancy state 34 of the hard shoulder 16 is determined and, based on the occupancy state 34 and based on a decision criterion, the clearance 14 for the use of the hard shoulder 16 is provided of means of the motor-vehicle-external, central electronic computing device 12 of the monitoring system 10.

It is thereby provided that the hard shoulder 16 is detected by means of at least the detection device 28, 30 of a motor vehicle 20, 22, 24 travelling on the road 18 and the detected hard shoulder 16 is transmitted to the central electronic computing device 12 for evaluation and the occupancy state 34 with regard to a dynamic object on the hard shoulder 16 is determined.

FIG. 2 shows a schematic perspective view of an embodiment of the monitoring system 10. In particular, it is shown here that the road 18 can have a first lane 38, a second lane 40 and a third lane 42. The first motor vehicle 20 is located in the first lane 38, the second motor vehicle 22 is located in the adjacent second lane 40. The third motor vehicle 24 is located in front of the first motor vehicle 20 in the first lane 38. A truck 44 is shown between the first motor vehicle 20 and the third motor vehicle 24. Furthermore, it is shown in particular that at least the first motor vehicle 20 and the second motor vehicle 22 have a detection area 46 which can be detected in particular by the detection device 28, 30. The truck 44 is located, in particular, within the detection area 46 of the second motor vehicle 22. In particular, it is therefore not possible for the hard shoulder 16 to be detected by the second motor vehicle 22. The hard shoulder 16 is only detected in the present case by the first motor vehicle 22 and the third motor vehicle 24.

Furthermore, FIG. 2 shows that the monitoring system 10 can have a traffic control system 48. The traffic control system 48 for the most part has four visual displays 50 which are in particular assigned to a respective lane 38, 40, 42 and to the hard shoulder 16. In the present case, no clearance 14 is given for the hard shoulder 16, which is indicated in particular by an X on the corresponding display 50.

It is thus shown, in particular, that the hard shoulder 16 is detected by a plurality of motor vehicles 20, 22, 24 by means of a plurality of detection devices 28, 30. By means of the plurality of detection devices 28, 30, the determined occupancy state 34 can be verified by means of the central electronic computing device 12.

Furthermore, it can be provided that a current volume of traffic is taken into account as a decision criterion for the clearance 14 for the hard shoulder 16. For example, the hard shoulder 16 can only be given clearance when, for example, an increased volume of traffic is recorded.

The hard shoulder 16 can, in particular, only be detected for a predefined section of the hard shoulder 16 and/or for a predefined time by means of the at least one detection device 28, 30. The clearance 14 of the hard shoulder 16 can be transmitted, in particular, in an automated manner to the traffic control system 48 of the monitoring system 10.

In particular, it is thus shown in FIG. 2 that the motor vehicles 22, 24, 26 can be equipped with various detection devices 28, 30 for detecting the surroundings, whereby these in turn interpret or classify their surroundings themselves. Thus, based on the merging of the corresponding sensor data, an object type/location, state, and time reference can be made for dynamic objects which can be, for example, people, items, or other motor vehicles. It is therefore known whether a dynamic object is moving or stationary on the hard shoulder 16. The motor vehicles 20, 22, 24 in turn use their communication module to send the detected objects with, for example, meta-information and live images of the surroundings to the motor-vehicle-external, central electronic computing device 12 or directly to a user of the monitoring system 10. The data from various motor vehicles 20, 22, 24 on an identical road section in a defined period of time is then merged within the motor-vehicle-external, central electronic computing device 12. In this way, a road 18 occupied by other motor vehicles 20, 22, 24 or the truck 44, or glare due to the sun and an obscured view of the hard shoulder 16 can be compensated for. In addition, the individual live images of the surroundings are combined to provide a clear view of the hard shoulder 16 for possible manual inspection or evidence.

By the different motor vehicles 20, 22, 24 all journeying within a defined time interval within a defined section, the reliability of the clearance can be increased and the required confidence level, in other words a confidence level 52 (FIG. 3), can be specifically defined. If the motor vehicle 20, 22, 24 cannot classify the object on the hard shoulder 16 sufficiently, an online evaluation by means of image recognition algorithms in the motor-vehicle-external, central electronic computing device 12 is also possible. The object classification also enables anonymization, as the image data is not mandatory and only the information about an occupied or unoccupied lane is output. The amount of data can be reduced by creating so-called campaigns so that the data is collected and sent on to the motor-vehicle-external, central electronic computing device 12 only in regions with a dynamic hard shoulder 16 that can be given clearance.

Figure 3:
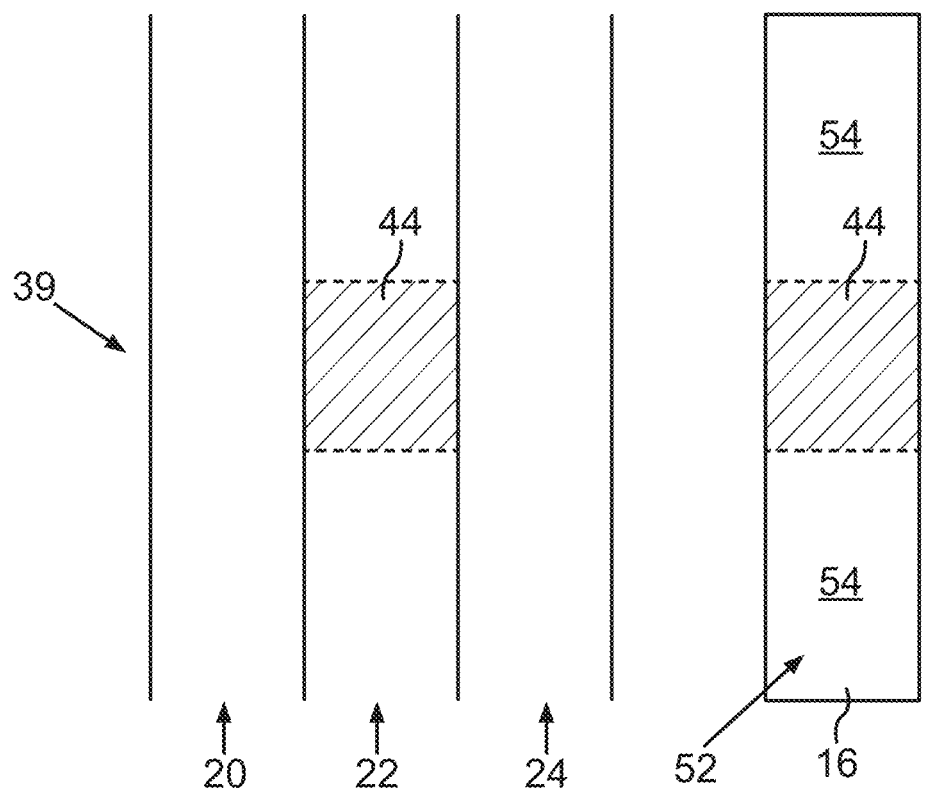
FIG. 3 shows a schematic view for evaluating the occupancy state as per FIG. 2.

FIG. 3 shows a schematic view for evaluating the occupancy state 34. In particular, the hard shoulder 16 can be continuously detected by the first motor vehicle 20. The second motor vehicle 22 cannot monitor the hard shoulder 16 sufficiently in the area of the truck 44. The third motor vehicle 24 can also continuously monitor the hard shoulder 16. The confidence level 52 is then displayed on the right-hand side. In particular in the area of the truck 44, the confidence level 52 can then be correspondingly lower, since not enough information is provided here by the second motor vehicle 22. In particular, the clearance 14 may only be given when an increased confidence level 52, such as that shown outside the areas of the truck 44, is detected. It is thus provided that, based on the detection of the hard shoulder 16, the confidence level 52 for the occupancy state 34 is generated by means of the central electronic computing device 12 and, on the basis of the confidence level 52, the clearance 14 is provided by means of the central electronic computing device 12.

In an area 54 with the confidence level 52, a complete clearance 14 for the hard shoulder 16 can thus be given. In the area of the truck 44, only an average confidence level 52 can then in turn be provided, so that no clearance 14 can be given for this area. The direct clearance 14 can then only be given, in particular, depending on a predefined length of the hard shoulder 16. If, for example, the hard shoulder 16 is identified as being unoccupied for a distance of 5 km, only then can this hard shoulder 16 be given clearance. If the hard shoulder is occupied or if the confidence level 52 is too low, no clearance is given for the hard shoulder 16.

In summary, the figures show a method for monitoring the hard shoulder using vehicle data to give dynamic clearance of the hard shoulder.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for a monitoring system to provide a clearance for use of a hard shoulder of a road for motor vehicles, the method comprising:
   detecting, by at least one detection device of a plurality of motor vehicles traveling on the road, the hard shoulder;
   automatically transmitting, by the plurality of motor vehicle to a motor vehicle-external, central electronic computing device of the monitoring system, the detection of the hard shoulder, wherein the detection transmitted by each of the plurality of motor vehicles includes an image, a location, and a time reference;
   merging, by the motor vehicle-external, central electronic computing device, the images transmitted by each of the plurality of motor vehicles using the location and the time reference transmitted by each of the plurality of motor vehicles;
   automatically determining, using image recognition of the merged images, an occupancy state of the hard shoulder by at least one dynamic object on the hard shoulder; and
   automatically providing the clearance for the use of the hard shoulder based on the determined occupancy state and based on a decision criterion by the motor vehicle-external, central electronic computing device by changing a status of a display on the road to indicate the hard shoulder is cleared,
   wherein the at least one detection device is a camera, a radar, lidar, or ultrasound sensor.

2. The method of claim 1, wherein the decision criterion includes a current volume of traffic.

3. The method of claim 1, wherein the hard shoulder is detected by the at least one detection device each of the plurality of motor vehicles for
   a predefined section of the hard shoulder, or
   a predefined time.

4. The method of claim 1, wherein the display is part of a traffic control system of the monitoring system, and wherein the clearance of the hard shoulder is automatically transmitted to the traffic control system.

5. The method of claim 1, wherein, based on the detection of the hard shoulder, a confidence level is generated for the occupancy state by the motor vehicle-external, central electronic computing device and, wherein, based on the generated confidence level, the clearance is provided by the motor vehicle-external, central electronic computing device.

6. The method of claim 1, wherein the clearance is provided in real time.

7. A monitoring system for providing a clearance for use of a hard shoulder of a road for motor vehicles, the monitoring system comprising:
   a plurality of motor vehicles traveling on the road, each of the plurality of motor vehicles comprising at least one detection device configured to detect the hard shoulder, wherein the at least one detection device is a camera, a radar, lidar, or ultrasound sensor; and
   a motor vehicle-external, central electronic computing device,
   wherein the at least one detection device of each of the plurality of motor vehicles is configured to automatically transmit the detected hard shoulder to the motor vehicle-external, central electronic computing device, wherein the detection transmitted by each of the plurality of motor vehicles includes an image, a location, and a time reference,
   wherein the motor vehicle-external, central computing device is configured to
      receive, from the plurality of motor vehicles, the detection of the hard shoulder,
      merge the images transmitted by each of the plurality of motor vehicles using the location and the time reference transmitted by each of the plurality of motor vehicles,
      automatically determine, based on the detection of the hard shoulder, an occupancy state of the hard shoulder by at least one dynamic object on the hard shoulder, and
      automatically provide the clearance for the use of the hard shoulder based on the determined occupancy state and based on a decision criterion by the motor vehicle-external, central electronic computing device by changing a status of a display on the road to indicate the hard shoulder is cleared.

8. The monitoring system of claim 7, wherein the motor vehicle-external, central computing device is configured to use a current traffic volume as the decision criterion includes a current volume of traffic.

9. The monitoring system of claim 7, wherein the at least one detection device of each of the plurality of motor vehicles is configured to detect the hard shoulder for
   a predefined section of the hard shoulder, or
   a predefined time.

10. The monitoring system of claim 7, further comprising:
    a traffic control system of the monitoring system, wherein the motor vehicle-external, central computing device is configured to automatically transmit the clearance of the hard shoulder to the traffic control system.

11. The monitoring system of claim 7, wherein the motor vehicle-external, central computing device is configured to, based on the detection of the hard shoulder, generate a confidence level for the occupancy state and, wherein, based the motor vehicle-external, central computing device is configured to provide the clearance based on the generated confidence level.

12. The monitoring system of claim 7, wherein the motor vehicle-external, central computing device is configured to provide the clearance in real time.

\* \* \* \* \*